United States Patent
Zolla

(10) Patent No.: US 6,877,213 B2
(45) Date of Patent: Apr. 12, 2005

(54) FEATURE SIZE REDUCTION IN THIN FILM MAGNETIC HEAD USING LOW TEMPERATURE DEPOSITION COATING OF PHOTOLITHOGRAPHICALLY-DEFINED TRENCHES

(75) Inventor: Howard Gordon Zolla, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 10/041,004

(22) Filed: Jan. 7, 2002

(65) Prior Publication Data

US 2003/0128460 A1 Jul. 10, 2003

(51) Int. Cl.[7] .................... G11B 5/127; H04R 31/00
(52) U.S. Cl. .................. 29/603.12; 29/603.15; 205/211; 216/39; 360/126; 360/317
(58) Field of Search ............... 29/603.3, 603.7, 29/603.12–603.16, 603.18, 603.03, 603.04, 603.06, 603.07; 205/205, 220, 221; 216/22, 39, 49, 67, 75; 360/126, 317; 438/696, 947

(56) References Cited

U.S. PATENT DOCUMENTS

| | | | |
|---|---|---|---|
| 4,417,393 A | 11/1983 | Becker | 29/846 |
| 4,541,001 A * | 9/1985 | Schutten et al. | 257/331 |
| 4,803,338 A | 2/1989 | Kumasaka et al. | 360/122 |
| 4,871,630 A | 10/1989 | Giammarco et al. | 430/14 |
| 5,315,151 A * | 5/1994 | Hsieh et al. | 257/592 |
| 5,595,941 A | 1/1997 | Okamoto et al. | 437/228 |
| 5,658,826 A | 8/1997 | Chung | 438/570 |
| 5,710,066 A | 1/1998 | Okamoto et al. | 437/228 |
| 5,719,089 A | 2/1998 | Cherng et al. | 438/637 |
| 5,802,700 A | 9/1998 | Chen et al. | 29/603.14 |
| 5,863,707 A | 1/1999 | Lin | 430/313 |
| 5,885,750 A * | 3/1999 | Hsiao et al. | 427/96 |
| 5,907,775 A | 5/1999 | Tseng | 438/261 |
| 5,910,871 A | 6/1999 | Kawanami et al. | 360/122 |
| 5,928,967 A * | 7/1999 | Radens et al. | 438/740 |
| 6,100,014 A | 8/2000 | Lin et al. | 430/314 |
| 6,136,696 A | 10/2000 | Horiba | 438/639 |
| 6,140,201 A | 10/2000 | Jenq et al. | 438/396 |
| 6,423,475 B1 * | 7/2002 | Lyons et al. | 430/314 |
| 6,521,335 B1 * | 2/2003 | Amin et al. | 360/126 |
| 6,540,928 B1 * | 4/2003 | Kobrin et al. | 216/22 |

* cited by examiner

Primary Examiner—A. Dexter Tugbang
Assistant Examiner—Donghai D. Nguyen
(74) Attorney, Agent, or Firm—Walter W. Duft

(57) ABSTRACT

A method for reducing feature size in a thin film magnetic write head includes plating a seed layer over a selected base layer, spinning a photoresist layer onto the seed layer, defining a trench in the photoresist layer, depositing an insulative spacer layer to cover the trench side walls using a low temperature chemical vapor deposition process, anisotropically etching to remove spacer layer material from the bottom of the trench and thereby expose the plating seed layer while leaving intact vertical portions of the spacer layer that cover the trench side walls and narrow its width, forming a structure of reduced feature size by electroplating metallic material into the narrowed trench, stripping away the photoresist layer and the spacer layer vertical portions, and milling or sputter etching the plating seed layer to leave a structure of reduced feature size.

30 Claims, 5 Drawing Sheets

FEATURE SIZE REDUCTION IN THIN FILM MAGNETIC HEAD USING LOW TEMPERATURE DEPOSITION COATING OF PHOTOLITHOGRAPHICALLY-DEFINED TRENCHES

BACKGROUND OF THE INVENTION

1. Field of the Invention

The present invention relates to thin film heads for magnetically writing information on data storage media, and particularly to fabrication processes for manufacturing such heads. Still more particularly, the invention concerns the reduction of write head feature size beyond that which can be achieved using conventional photolithography.

2. Description of the Prior Art

By way of background, thin film magnetic write heads for use in data storage devices, such as disk drives, conventionally include P1 and P2 pole pieces that cooperate to record magnetic domains in concentric track patterns on an underlying data storage medium. The configuration of such pole pieces, and particularly the track width feature size, is an important determinant of the track width of the magnetic domains recorded on the underlying medium. Because narrow track width translates to increased data storage capacity, all other things being equal, it is a design goal of disk drive manufactures to reduce the track width feature size of the pole pieces.

In thin film magnetic head processing, features are constructed using photolithographic processes. For example, to fabricate a pole piece, a photoresist layer is formed, then photo-exposed using a photolithographic mask to define the pole piece geometry and then photo-developed to form a trench conforming to the defined geometry. The metallic pole piece material (typically a nickel-iron alloy) is deposited in the trench using an electroplating process. The remaining photoresist material is then stripped away, leaving behind the fully formed pole piece.

The problem with this type of processing is that feature size can only be narrowed photolithographically by using shorter wavelength light and contrast enhancement techniques. Thus, whether conventional photolithography is used, or newer technologies such as deep UV or electron beam lithography, reductions in feature size typically require new and more expensive light sources and exposure technology. An additional disadvantage of photolithographic solutions is that line edge roughness becomes a concern as photolithographic features become ever smaller.

Accordingly, an improved technique for reducing feature size in a thin film magnetic write head is required if improvements in disk drive performance are to be achieved. What is particularly needed is a new technique whereby pole piece feature size can be reduced while using any thin film magnetic head photolithographic process, including deep UV or electron beam lithography, without having to resort to expensive photolithographic resolution enhancement solutions. An additional requirement is that the technique be compatible with the low melting point of conventional photoresist materials and with the low temperature processing restrictions that apply to the fabrication of integrated read/write heads, wherein a magnetic write head is combined with a thin film magnetic read head. Elevated processing temperatures in such environments can damage the read head elements, which are typically comprised of extremely thin ferromagnetic layers. A further requirement is that of reducing the line edge roughness of the photolithographically defined trenches.

SUMMARY OF THE INVENTION

The foregoing problems are solved and an advance in the art is obtained by a novel method for reducing feature size in a thin film magnetic write head using low temperature deposition coating of photolithographically-defined trenches. According to the method, a plating seed layer is applied over a selected base layer and a photoresist layer is spun onto the seed layer to a desired thickness. A trench is defined in the photoresist layer to initiate the formation of a stencil for the feature. The trench is deep enough to expose the plating seed layer, and has substantially vertical side walls. Following formation of the trench, an insulative spacer layer is deposited to cover the trench side walls using a low temperature chemical vapor deposition process. Horizontal portions of the spacer layer are anisotropically etched to remove spacer layer material from the bottom of the trench and thereby expose the plating seed layer, while leaving intact vertical portions of the spacer layer that cover the trench side walls. This process defines a narrowed trench that is reduced in horizontal size according to approximately twice the thickness of the spacer layer as deposited on the trench side walls. A structure of reduced feature size is formed by electroplating metallic material into the narrowed trench. The photoresist layer and the spacer layer vertical portions are then stripped away, and the plating seed layer is milled or sputter etched to leave the structure of reduced feature size.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF PREFERRED EMBODIMENTS

Figure 1:
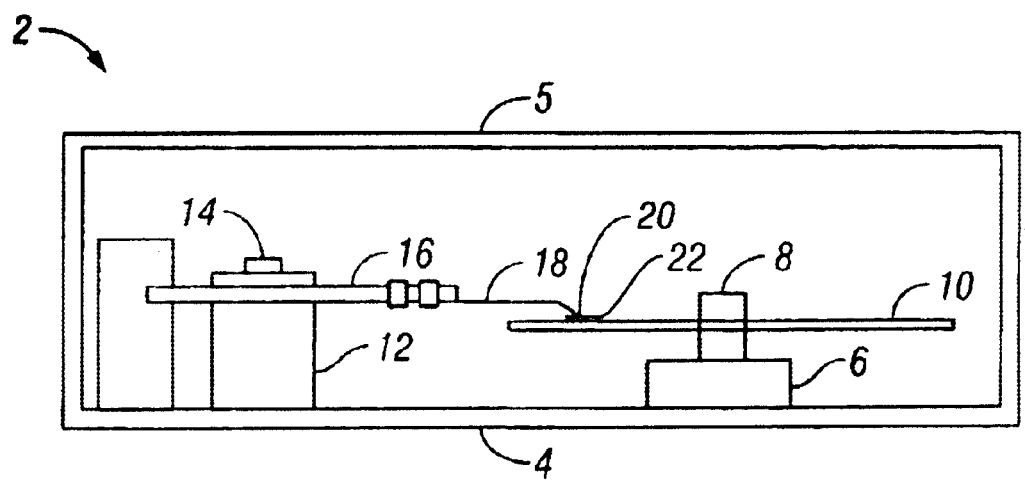
FIG. 1 is a simplified vertical sectional view of a magnetic disk drive that incorporates a magnetic write head made according the present invention.
Figure 2:
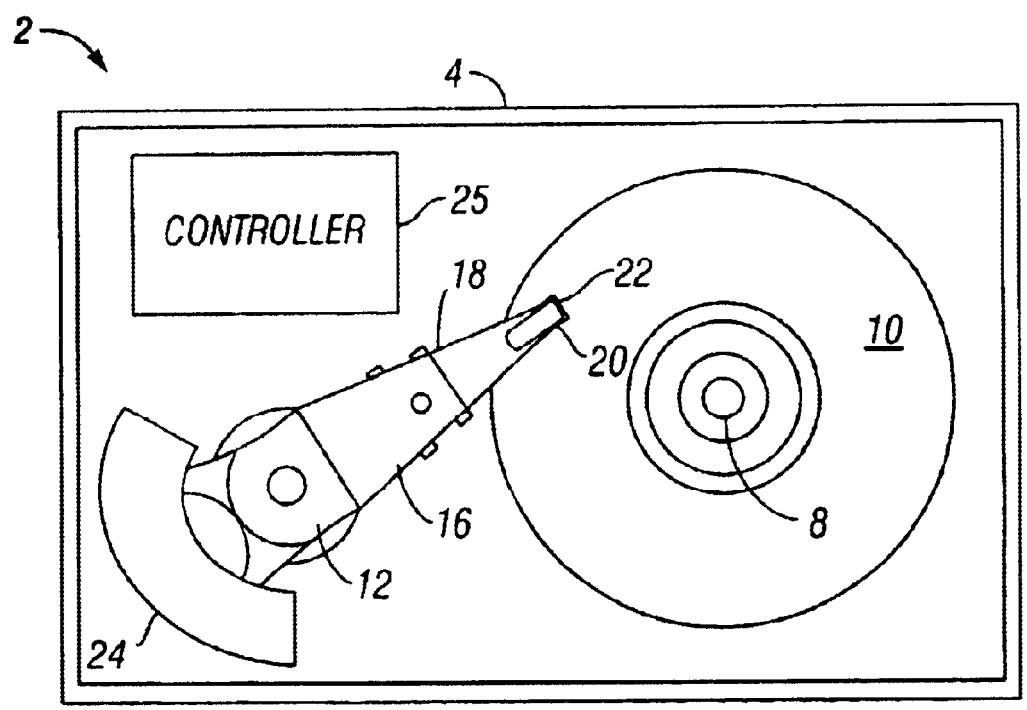
FIG. 2 is a simplified horizontal sectional view of the disk drive of FIG. 1.

Turning now to the figures, wherein like reference numerals represent like elements in all of the several views, FIGS. 1 and 2 illustrate a disk drive 2 that includes a magnetic write head constructed using the method of the invention. The disk drive 2 conventionally includes a base casting 4 made from aluminum or other suitable material. A cover 5 is removably mounted thereto via a hermetic seal (not shown). The base casting 4 supports a conventional spindle drive motor 6 having an associated drive spindle 8. The drive spindle 8 carries a disk 10 for high speed rotation therewith. Other disks (not shown) may also be carried on the drive spindle 8 to form a spaced vertically stacked disk platter arrangement. The disk 10 is made from a suitable material of a type usually found in magnetic disk drive assemblies. In particular, the disk 10 is formed from an aluminum or glass substrate with appropriate coatings being applied thereto such that at least one, and preferably both, of the upper and lower surfaces of the disk are magnetically encodable and aerodynamically configured for high speed interaction with a read/write transducer (described below).

Data access to the disk 10 is achieved with the aid of an actuator 12 that is mounted for rotation about a stationary pivot shaft 14. The actuator 12 includes a rigid actuator arm 16 that carries a flexible suspension 18. The suspension 18 in turn carries a slider 20 that mounts a transducer 22. The transducer 22 is an integrated device that includes a magnetic write head and a read head that may incorporate a conventional magnetoresistive sensor or the like. The actuator 12, which is conventionally driven by a voice coil motor 24, moves the slider 20 generally radially across the surface of the disk 10 so that the transducer 22 is able to trace concentric data tracks on the disk.

Data is recorded on the disk 10 by the write head portion of the transducer 22. Data is read from the disk 10 by the read head portion of the transducer 22. This data is processed into a readback signal by signal amplification and processing circuitry (not shown) that is conventionally located on the actuator arm 16. The readback signal, which carries both data and transducer position control information, is sent to the drive controller 25 for conventional processing. The controller 25 also provides write data and transducer position control information during data write operations.

It will be appreciated that the foregoing detailed description of the disk drive 2 and the transducer 22 is exemplary in nature, and that many other design configurations would be possible while still incorporating a write head that has been fabricated according to the invention. For example, the disk drive 2 may include a large number of disks and actuators, and each actuator may carry plural suspensions and multiple sliders. Moreover, instead of using an air bearing slider, an alternative transducer carrying structure may be used that maintains the transducer 22 in contact or near contact with the disk 10.

Figure 3:
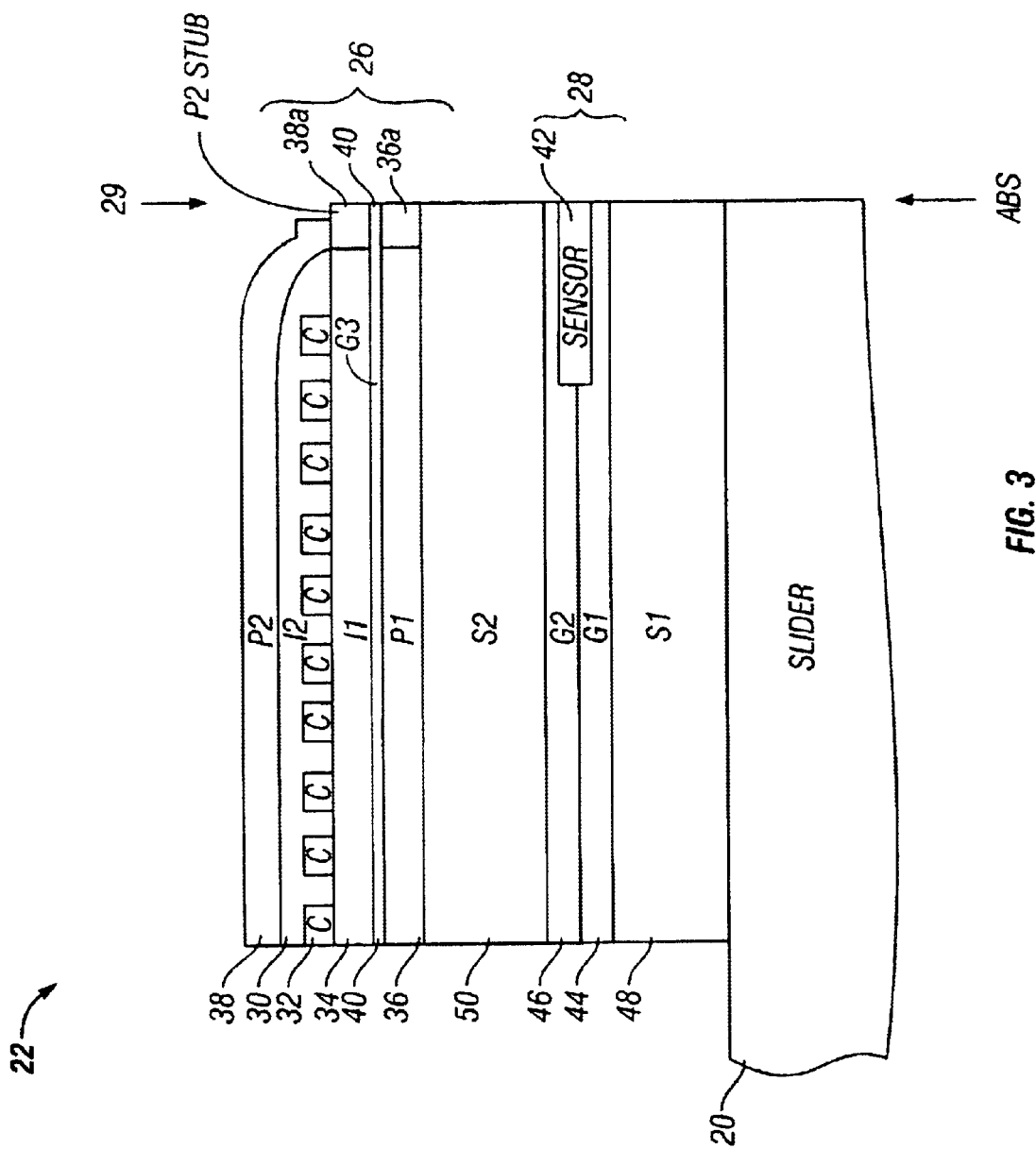
FIG. 3 is a sectional view taken through the track width centerline of an integrated magnetic read/write head made in accordance with the invention.
Figure 4:
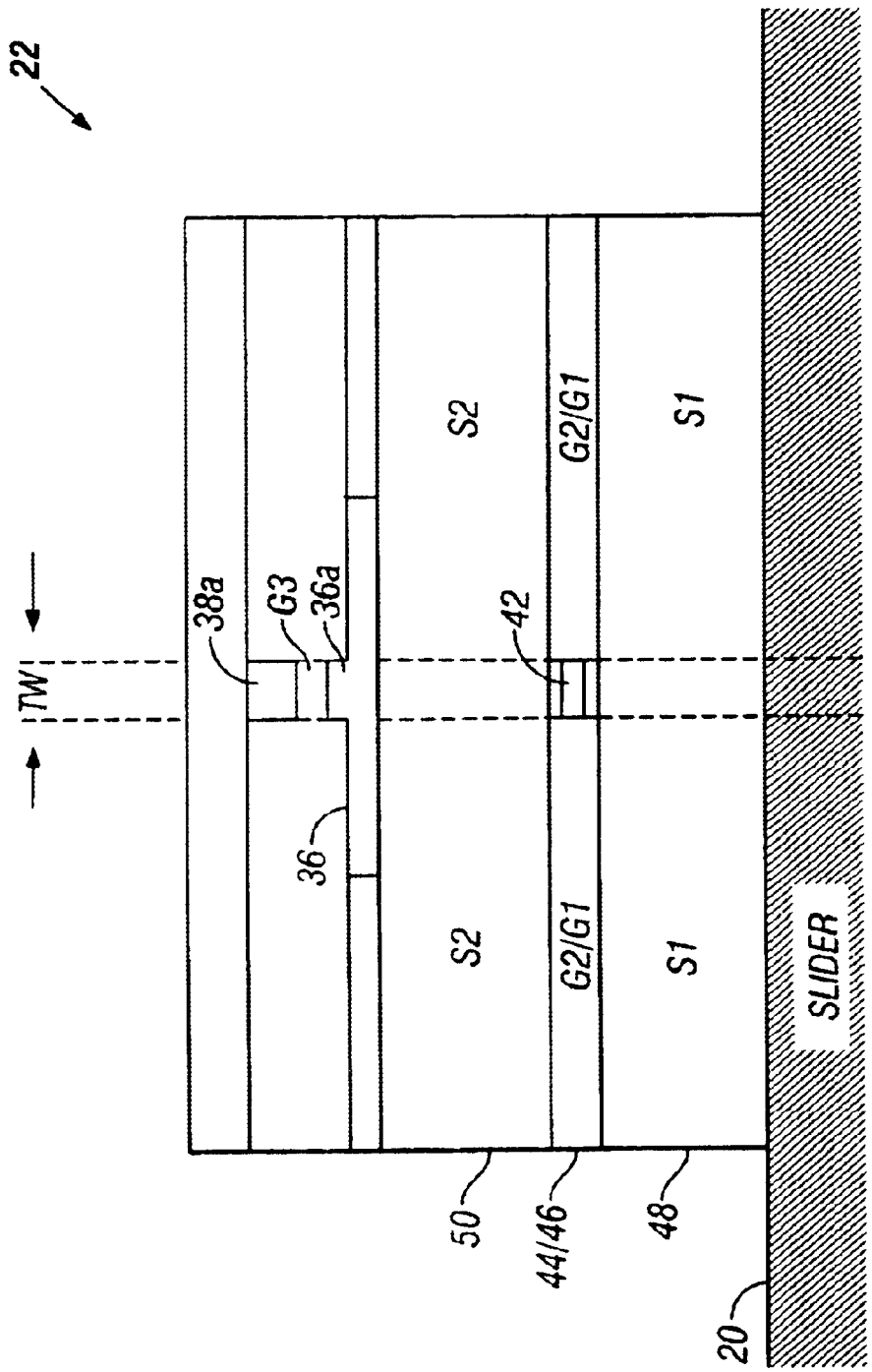
FIG. 4 is a front elevational view (taken from the air bearing surface) of the integrated read/write head of FIG. 3.

Turning now to FIGS. 3 and 4, the write head portion of the transducer 22 is shown at 26 and the read head portion of the transducer is shown at 28. The transducer 22 is shown in FIG. 3 as being lapped at 29 to form an air bearing surface (ABS). This ABS 29 is spaced from the rotating disk 10 during drive operation by virtue of the above-described air bearing. FIG. 4 shows the transducer 22 from the vantage point of the ABS 29.

The write head 26 conventionally includes a combined layer comprising I2 insulative material 30 and plural inductive coil loops 32. The combined insulation and coil layer 30/32 is formed on an I1 insulation layer 34. The coils of the combined layer 30/32 inductively drive first and second pole pieces 36 and 38. A G3 gap layer 40 is sandwiched between the pole pieces 36 and 38 to provide a magnetic write gap at the pole tips 36a and 38a located adjacent to the ABS 29. Note that the pole piece 36 is commonly referred to as a "P1" pole piece and is labeled as such in FIG. 3. The pole piece 38 may either be referred to as a "P2" or "P3" pole piece depending on how the pole tip 38a is formed. If, as shown in FIG. 3, the pole tip 38a is formed separately from the pole piece 38, the pole piece 38 is referred to as a "P3" pole piece (and is labeled as such in FIG. 3) and the pole tip 38a is referred to as a "P2 stub" (as also shown in FIG. 3). If the pole tip 38a is formed with as part of the pole piece 38, the pole piece 38 is referred to as a "P2" pole piece. During a data write operation, signal current is conducted through the coils C of the combined layer 30/32, and flux is induced into the pole pieces 36 and 38. This flux fringes across the pole tips 36a and 38a at the ABS 29 and forms magnetic domains on the rotating disk 10. As indicated above, the magnetic domains are arranged to define concentric tracks on the disk 10. Note that the back gap portion of the write head 26 is not shown in FIG. 3.

FIG. 4 shows the face of the pole tip portions 36a and 38a of the pole pieces 36 and 38. The track width feature size of the pole tips 36a and 38a is defined by the dimension TW in FIG. 4. It will be seen that the pole piece 36 also includes a lower portion that extends beyond the track width dimension TW. This configuration is shown by way of example only and will not necessarily be found in other write heads made in accordance with the invention.

The read head 28 of FIGS. 3 and 4 includes a thin film read sensor 42 disposed in adjacent G1 and G2 gap areas 44 and 46. The G1 and G2 gap areas 44 and 46 are in turn sandwiched between a first (S1) magnetic shield layer 48 and second (S2) magnetic shield layer 50 that in some designs may also be used to provide the pole piece 36. The S1 shield layer 48 is conventionally formed over the slider 20, which is only partially shown in FIGS. 3 and 4 for clarity. During a read operation, magnetized domains on the concentric tracks of the rotating disk 10 inject flux into the read sensor 42. This influences the read sensor 42, causing a corresponding signal to be produced by the read sensor's sensing circuit (not shown).

Turning now to FIGS. 5A–5H, a method is shown for producing features of the write head 26, such as the pole piece 38 of FIGS. 3 and 4, so that its pole tip 38a has reduced track width feature size at the ABS 29. Each of FIGS. 5A–5H is a sectional view taken along what will become the ABS 29 of the transducer 22, such that the pole piece track width feature size can be illustrated.

Figure 5A:
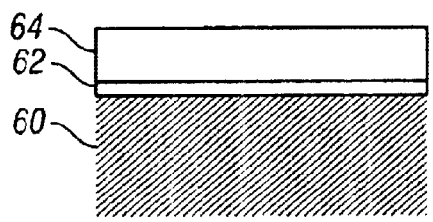
FIGS. 5A–5H are a sequence of diagrammatic sectional views showing the formation of a write head with reduced track width feature size according to the invention.

In FIG. 5A, a suitable base layer 60 is formed. A plating seed layer 62 comprising a nickel-iron (NiFe) alloy, a nickel-iron-cobalt (NiFeCo) alloy, or any other conventional plating seed layer metal, is applied over the base layer at a suitable thickness, such as about 0.1 $\mu$m. A photoresist imaging layer 64 comprising a conventional photoactive polymer material is then spun onto the seed layer 62 to a desired thickness, such as up to about 3–5 $\mu$m. No hardening of the photoresist layer 64, such as by deep ultraviolet exposure or high temperature heat treatment (e.g., 200°–250° C.) is used.

Figure 5B:
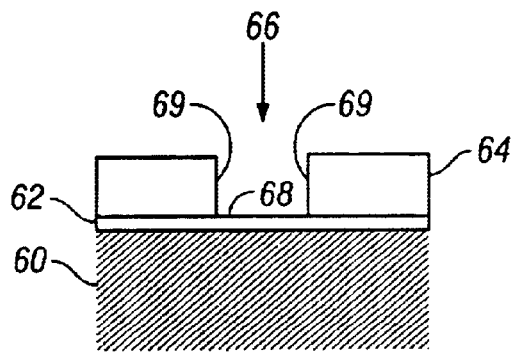

In FIG. 5B, a trench 66 is defined in the photoresist layer 64 to initiate the formation of a stencil for the pole piece 38 of FIGS. 3 and 4. The trench 66 is defined using the usual photoresist masking techniques, with the photoresist material being either a negative resist, or more conventionally, a positive resist. Using a wet etching process to remove the exposed photoresist material, the trench 66 will extend to the seed layer 62, and will be defined by a trench bottom 68 and substantially vertical side walls 69 that extend from the trench bottom to the top of the photoresist layer 64.

Figure 5C:
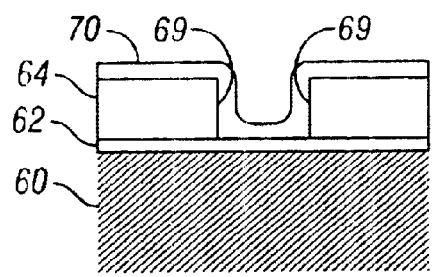

As shown in FIG. 5C, following formation of the resist-imaged trench 66 of FIG. 5B, an insulative spacer layer 70 is deposited to cover the at least the trench side walls 69, using a low temperature chemical vapor deposition (CVD) process.

Note that the chemical vapor deposition process should preferably be one that can be implemented at relatively low temperature, e.g., less than about 120° Celsius, so that there is no softening of the photoresist layer 64. This requirement may be relaxed if a photoresist material is used which is compatible with higher temperatures. However, the temperature must not be so high as to cause degradation of the material layers of the read sensor 42.

The spacer layer material can be made from a variety of materials, including semiconductor and metal oxides and nitrides, such as tantalum oxide ($Ta_2O_5$), silicon dioxide ($SiO_2$), silicon nitride ($Si_3N_4$) and the like, or any other suitable material that can be applied using CVD, is an electrical insulator, and is etchable using an anisotropic etching process. Preferably, a low temperature atomic layer chemical vapor deposition (ALCVD) process is used to coat the spacer layer material onto the photoresist layer 64, thereby allowing very fine control of spacer layer thickness, and thus the track width of the pole piece 38 (see FIGS. 3 and 4) to be formed. Note that ALCVD is sometimes also referred to as atomic layer deposition or ALD.

Figure 5D:
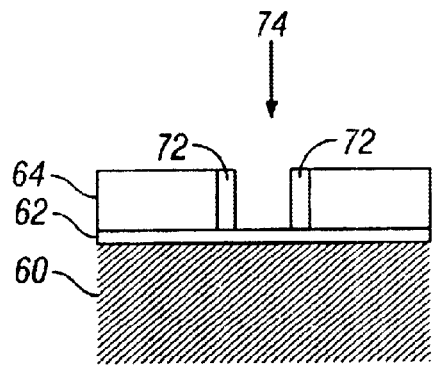

In FIG. 5D, the horizontal portions of the spacer layer 70 are etched anisotropically using reactive ion etching (RIE) or the like to remove spacer layer material from the bottom of the trench, and thereby expose the plating seed layer 62. The spacer layer vertical portions 72 that cover the trench side walls 69 are left intact. This process defines a narrowed trench 74 that is narrowed according to approximately twice the thickness of the spacer layer vertical portions 72.

The thickness of the spacer layer vertical portions 74 may be controlled to range from zero up to about 200 nm. At that point, the time required to deposit additional spacer layer material may act as a disincentive against further increases in spacer layer thickness. The thickness at which the spacer layer 70 is applied will also depend on the starting width of the trench 68, with less spacer layer material being required for trenches of small size.

Advantageously, by virtue of the manner in which the spacer layer is deposited, the spacer layer vertical portions 72 will have a relatively smooth surface, and the narrowed trench 76 can be contoured more precisely than a trench formed purely lithographically.

Figure 5E:
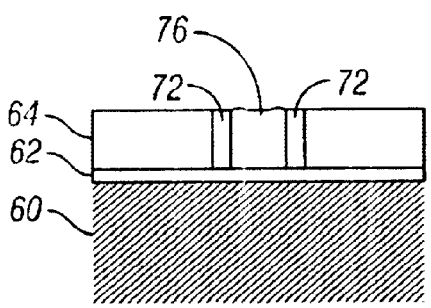

In FIG. 5E, a metallic pole tip structure 76 of reduced feature size (corresponding to the pole tip 38a of the pole piece 38 of FIGS. 3 and 4) is formed by electroplating metallic material, such as a nickel-iron (NiFe) alloy or the like, into the narrowed trench 74.

Figure 5F:
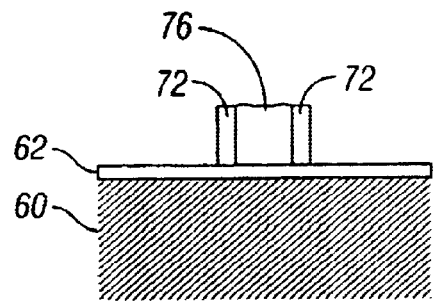
Figure 5G:
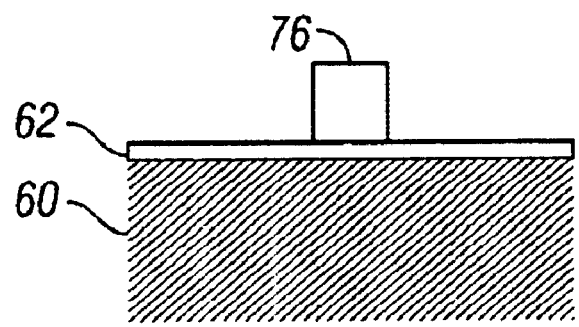

In FIG. 5F, the photoresist layer 64 is stripped away using conventional photoresist stripping. The photoresist layer 64 may alternatively be removed as part of the removal of the spacer layer vertical portions 72, as shown in FIG. 5G. The spacer layer vertical portions 72 are preferably stripped away using reactive ion etching or plasma stripping.

Figure 5H:
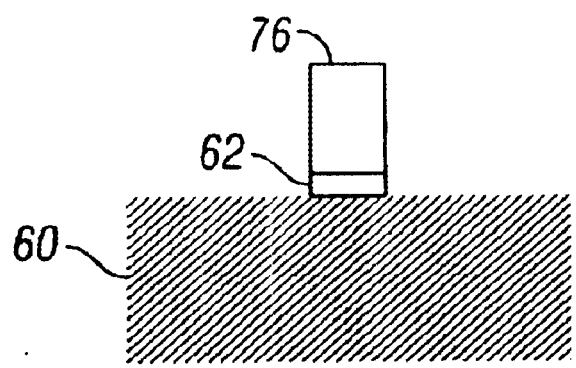

In FIG. 5H, the plating seed layer 62 is milled or sputter etched to leave behind a pole tip structure 76 of reduced track width feature size.

Accordingly, a method for reducing pole piece track width feature size in a magnetic write head using low temperature chemical vapor deposition coating of photolithographically-defined trenches has been disclosed. While various embodiments of the invention have been described, it should be apparent that many variations and alternative embodiments could be implemented in accordance with the invention. For example, although fabrication of the pole tip 38a is shown in FIGS. 5A–5H, the disclosed method could also be used to fabricate the pole tip 36a, as well as the coils 32 of the combined layer 30/32 (to reduce coil pitch). It is understood, therefore, that the invention is not to be in any way limited except in accordance with the spirit of the appended claims and their equivalents.

What is claimed is:

1. A method for reducing feature size in a thin film magnetic write head using low temperature deposition coating of photolithographically-defined trenches, comprising the steps of:

forming a base layer;
applying a plating seed layer over said base layer;
applying a photoresist layer over said plating seed layer to a desired thickness;
defining a trench in said photoresist layer that exposes said plating seed layer, said trench having substantially vertical side walls and a bottom defined by said plating seed layer;
depositing an insulative spacer layer using a low temperature chemical vapor deposition process to cover said trench side walls;
anisotropically etching horizontal portions of said spacer layer to remove spacer layer material from said trench bottom to expose said plating seed layer while leaving intact vertical portions of said spacer layer that cover said trench side walls, thereby defining a narrowed trench;
electroplating metallic material onto said plating seed layer to form a structure in said narrowed trench;
stripping away said photoresist layer; and
stripping away said spacer layer vertical portions;
whereby a structure of reduced feature size is formed.

2. A method in accordance with claim 1 wherein said feature is a pole piece or a coil.

3. A method in accordance with claim 1 wherein said spacer layer comprises a material from the group consisting of semiconductors, metal oxides and metal nitrides.

4. A method in accordance with claim 1 wherein said spacer layer comprises a material from the group consisting of including tantalum oxide, silicon dioxide and silicon nitride.

5. A method in accordance with claim 1 wherein said chemical vapor deposition process is an atomic layer chemical vapor deposition process.

6. A method in accordance with claim 1 wherein said spacer layer is deposited at a thickness of up to about 200 nm.

7. A method in accordance with claim 1 wherein said chemical vapor deposition process is performed at a temperature that does not cause deformation of said trench defined in said photoresist layer.

8. A method in accordance with claim 1 wherein said chemical vapor deposition process is performed without exceeding a temperature of about 120° Celsius.

9. A method in accordance with claim 1 wherein said write head is part of an integrated read/write head having a thin film read sensor, and said chemical vapor deposition process is performed without exceeding a temperature that could cause degradation of material layers in said read sensor.

10. A method in accordance with claim 1 wherein said photoresist layer and said spacer layer vertical portions are stripped away in a single step.

11. A magnetic recording transducer, said transducer having a thin film magnetic write head of reduced feature size formed by a process that comprises the steps of:

forming a base layer;
applying a plating seed layer over said base layer;
applying a photoresist layer over said plating seed layer to a desired thickness;
defining a trench in said photoresist layer that exposes said plating seed layer, said trench having substantially vertical side walls and a bottom defined by said plating seed layer;
depositing an insulative spacer layer using a low temperature chemical vapor deposition process to cover said trench side walls;

anisotropically etching horizontal portions of said spacer layer to remove spacer layer material from said trench bottom to expose said plating seed layer while leaving intact vertical portions of said spacer layer that cover said trench side walls, thereby defining a narrowed trench;

electroplating a metallic material onto said plating seed layer to form a structure in said narrowed trench;

stripping away said photoresist layer; and stripping away said spacer layer vertical portions;

whereby a structure of reduced feature size is formed.

12. A transducer in accordance with claim 11 wherein said pole piece is a pole piece or a coil.

13. A transducer in accordance with claim 11 wherein said spacer layer comprises a material from the group consisting of semiconductors, metal oxides and metal nitrides.

14. A transducer in accordance with claim 11 wherein said spacer layer comprises a material from the group consisting of tantalum oxide, silicon dioxide and silicon nitride.

15. A transducer in accordance with claim 11 wherein said chemical vapor deposition process is an atomic layer chemical vapor deposition process.

16. A transducer in accordance with claim 11 wherein said spacer layer is deposited at a thickness of up to about 200 nm.

17. A transducer in accordance with claim 11 wherein said chemical vapor deposition process is performed at a temperature that does not cause deformation of said trench defined in said photoresist layer.

18. A transducer in accordance with claim 11 wherein said chemical vapor deposition process is performed without exceeding a temperature of about 120° Celsius.

19. A transducer in accordance with claim 11 wherein said write head is part of an integrated read/write head having a thin film read sensor, and wherein said chemical vapor deposition process is performed without exceeding a temperature that could cause degradation of material layers in said read sensor.

20. A transducer in accordance with claim 11 wherein said photoresist layer and said spacer layer vertical portions are stripped away in a single step.

21. In a disk drive having a housing, a rotatable magnetic recording medium in the housing, an actuator carrying an actuator arm, a suspension, and a read/write head disposed in adjacent relationship with the recording medium, an improved thin film magnetic write head having reduced feature size formed by a process that comprises the steps of:

forming a base layer;

applying a plating seed layer over said base layer;

applying a photoresist layer over said plating seed layer to a desired thickness;

defining a trench in said photoresist layer that exposes said plating seed layer, said trench having substantially vertical side walls and a bottom defined by said plating seed layer;

depositing an insulative spacer layer using a low temperature chemical vapor deposition process to cover said trench side walls;

anisotropically etching horizontal portions of said spacer layer to remove spacer layer material from said trench bottom to expose said plating seed layer while leaving intact vertical portions of said spacer layer that cover said trench side walls, thereby defining a narrowed trench;

electroplating a metallic material onto said plating seed layer to form a structure in said narrowed trench;

stripping away said photoresist layer; and stripping away said spacer layer vertical portions;

whereby a structure of reduced track width feature size is formed.

22. A disk drive in accordance with claim 21 wherein said pole piece is a pole piece or a coil.

23. A disk drive in accordance with claim 21 wherein said spacer layer comprises a material from the group consisting of semiconductors, metal oxides and metal nitrides.

24. A disk drive in accordance with claim 21 wherein said spacer layer comprises a material from the group consisting of tantalum oxide, silicon dioxide and silicon nitride.

25. A disk drive in accordance with claim 21 wherein said chemical vapor deposition process is an atomic layer chemical vapor deposition process.

26. A disk drive in accordance with claim 21 wherein said spacer layer is deposited at a thickness of up to about 200 nm.

27. A disk drive in accordance with claim 21 wherein said chemical vapor deposition process is performed at a temperature that does not cause deformation of said trench defined in said photoresist layer.

28. A disk drive in accordance with claim 21 wherein said chemical vapor deposition process is performed without exceeding a temperature of about 120° Celsius.

29. A disk drive in accordance with claim 21 wherein said write head is part of an integrated read/write head having a thin film read sensor, and wherein said chemical vapor deposition process is performed without exceeding a temperature that could cause degradation of material layers in said read sensor.

30. A disk drive in accordance with claim 21 wherein said photoresist layer and said spacer layer vertical portions are stripped away in a single step.

* * * * *